Nov. 16, 1965     W. TALBOT     3,217,540
FUEL GAUGE
Filed Jan. 2, 1962     2 Sheets-Sheet 1
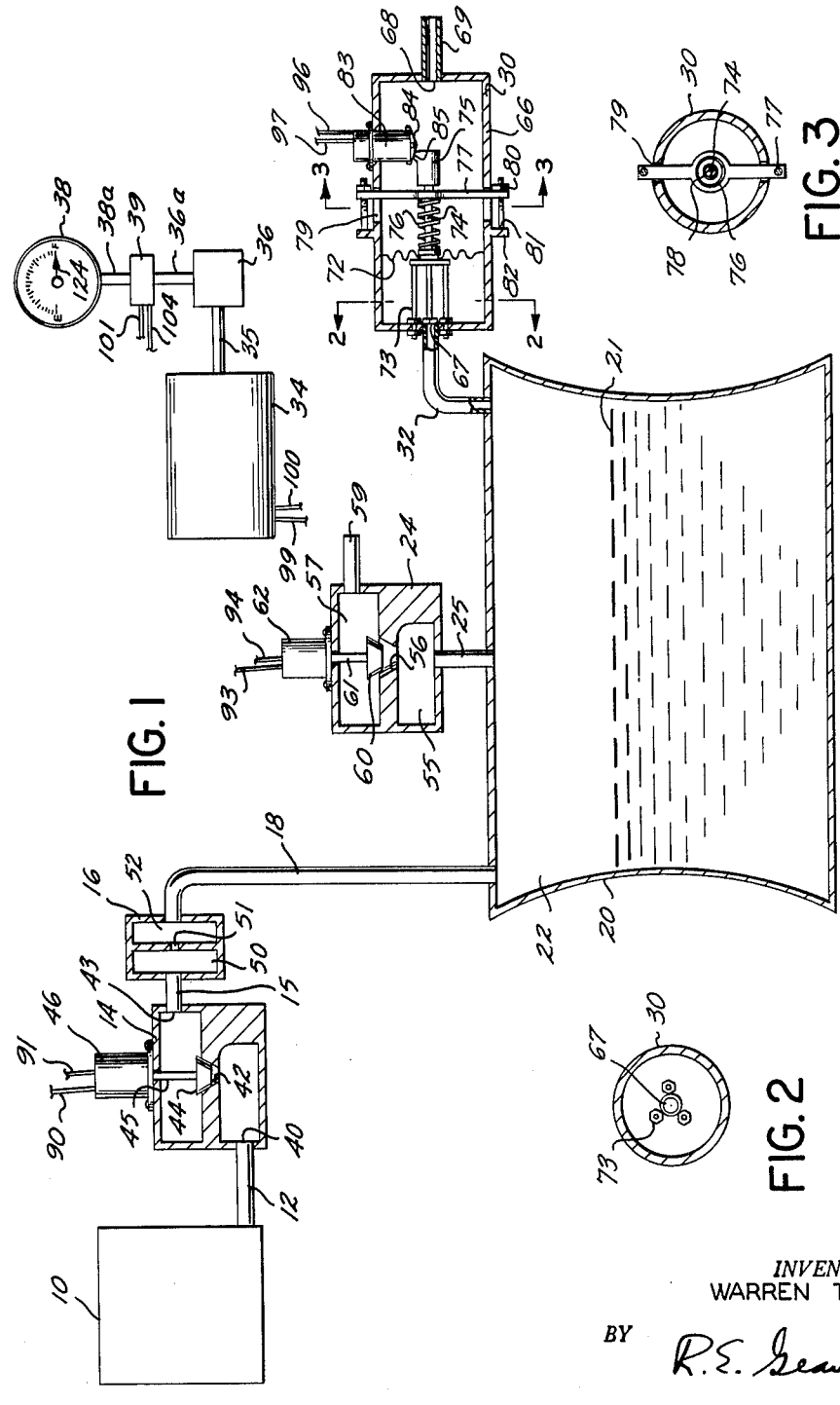
INVENTOR.
WARREN TALBOT
BY R.E. Geauque
ATTORNEY

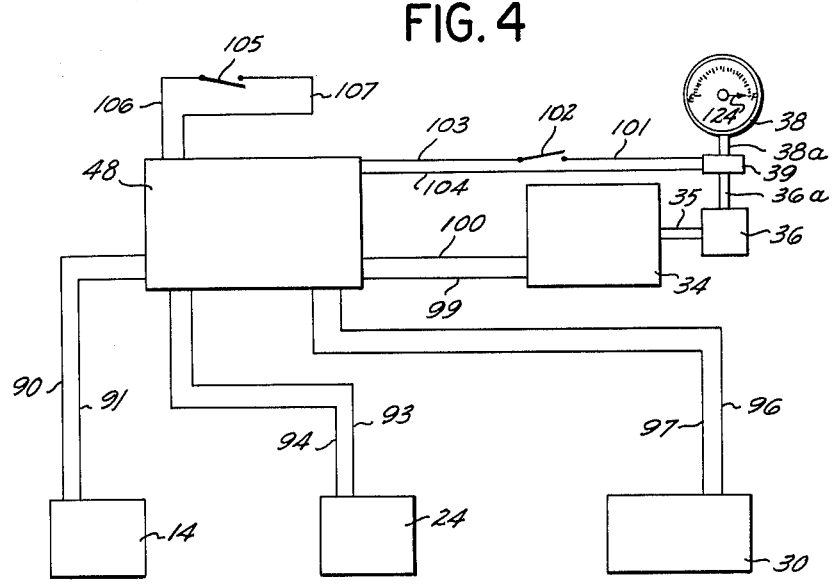

United States Patent Office 3,217,540
Patented Nov. 16, 1965

3,217,540
FUEL GAUGE
Warren Talbot, Woodland Hills, Calif., assignor, by mesne assignments, to Security First National Bank, Los Angeles, Calif., a national banking association
Filed Jan. 2, 1962, Ser. No. 163,415
1 Claim. (Cl. 73—290)

This invention relates to fuel gauges and more particularly to a gauge for determining the remaining liquid volume in a fuel tank of any configuration. The device is especially useful for, although not limited to, aircraft fuel tanks in which the liquid assumes various shapes depending upon the attitude of the aircraft.

Inexpensive and accurate liquid level gauges are available for measuring the volume of liquid in a tank when the tank is of a fixed shape and the transverse axis of the tank remains relatively level. Such gauges, however, are not suitable for use in connection with irregularly shaped tanks or in cases where the liquid within the tank does not remain level. This creates a problem which is especially troublesome in connection with accurately determining the fuel remaining in an aircraft where the fuel tanks are irregularly shaped and the fuel to be measured assumes various shapes depending upon the attitude of the aircraft.

It is known to determine the volume of liquid in a tank by charging the space above the liquid with a known amount of gas and measuring the change in pressure. In these devices, the known gas volume is connected with the volume above the liquid in the tank and the reduction in the total pressure serves as an indication of volume of the liquid therein. The apparatus for charging and measuring a known amount of gas together with the additional apparatus for measuring the change in pressure is somewhat cumbersome.

The device of the present invention, on the other hand, measures the time required for a given rate of charging gas from a pressurized source to vary the pressure above the liquid in a tank by a given amount. Such a system is efficient and economical and can be used to determine the amount of the liquid remaining in a tank expeditiously.

In view of the foregoing factors and conditions characteristic of devices which measure the volume of liquid in a container, it is a primary object of the present invention to provide a new and improved fuel gauge not subject to the disadvantages enumerated above and having apparatus adapted to measure the time required to produce a given pressure differential when a gas is charged at a given rate into the space above the liquid in a fuel tank to change the pressure in said space by a given amount.

Another object of the invention is to provide an improved pressure responsive device for accurately measuring the pressure differential established between a gas that has been charged into the empty space above the fuel in a fuel tank and the pressure surrounding the tank.

Still another object of the invention is to provide a device for converting the time required to vary the pressure in the empty space above a liquid in a tank by a given amount into a measure of the volume of remaining fluid in the tank.

A further object of the invention is to provide a device for measuring the volume of liquid remaining in a tank including means for metering gas into the empty space above the liquid in said tank, a differential pressure gauge for measuring the difference between the pressure of the gas above said liquid and ambient pressure of the tank, means for measuring the time required to establish said pressure differential, and a converter to convert said measure of time into a measure of volume of liquid remaining in said tank.

These and other more specific objects will appear upon reading the following specification and claim and upon considering in connection therewith the attached drawings to which they relate.

Referring now to the drawings in which a preferred embodiment of the invention is illustrated:

FIGURE 1 is a cross-section view showing an irregularly shaped fuel tank with a device of the invention connected thereto;

FIGURE 2 is a transverse sectional view taken along the line 2—2 of FIGURE 1;

FIGURE 3 is a transverse sectional view taken along line 3—3 of FIGURE 1;

FIGURE 4 is a schematic diagram of a device of the invention connected to a fuel tank; and FIGURE 5 is a schematic wiring diagram illustrating the electrical circuits used in connection with a device of the invention.

Referring again to the drawings and particularly to FIGURE 1, the device constituting the present invention generally includes a pressurized container 10 which may be filled with a suitable gas such as carbon-dioxide and which is connected by means of conduit 12 to a normally closed valve 14. A conduit 15 connects the valve 14 to a metering orifice 16 which, in turn, is connected through a conduit 18 to a fuel tank 20. The fuel tank 20 is sealed and contains a liquid which for purposes of illustration, assumes the level shown by the broken line 21 leaving an empty space, which will hereinafter be referred to as a chamber 22, thereabove. A normally open valve 24 is connected to the chamber 22 by means of a conduit 25 and vents the chamber 22 to atmosphere. A pressure transducer 30 is connected to the fuel tank 20 through a conduit 32 placing the chamber 22 in hydraulic communication with the pressure transducer 30. The change in pressure sensed by the pressure transducer 30 is employed to control the operation of an electric motor 34. The motor 34 provides a constant rate of output with constant excitation and transmits power through a shaft 35 to a gear box 36 which converts the motor output to an angular travel on a fuel gauge 38. A clutch 39 is connected into the system between the gear box 36 and the gauge 38 by means of shafts 36a and 38a, respectively.

The valve 14 and the metering orifice 16 control the flow of gas from the container 10 to the chamber 22. The valve 14 includes an inlet chamber 40, a valve seat 42 and an outlet chamber 43. A valve 44 is adapted to seat on the valve seat 42 and includes a stem 45 forming a part of a solenoid 46. The normally closed valve 14 is opened in response to a suitable electrical signal from a control box 48, shown diagrammatically in FIGURE 4.

The metering orifice 16 includes an inlet chamber 50, an orifice 51 and an outlet chamber 52. The orifice 16 meters gas from the container 10 into the chamber 22 at a fixed rate.

The normally open valve 24 includes an inlet chamber 55, a valve seat 56 and an outlet chamber 57. The inlet chamber 55 is connected to the conduit 25 and the outlet chamber 57 is vented to atmosphere through a pipe 59.

A valve 60 includes a valve stem 61 and is adapted to seat on the valve seat 56. The valve stem 61 is connected to a solenoid 62 which seats the valve 60 upon receipt of a suitable electrical signal from the control box 48.

The pressure transducer 30 includes a housing 66 having an inlet port 67, which is connected to the conduit 32, and an outlet port 68. A pipe 69 connects the outlet port 68 to atmosphere. A diaphragm 72 is transversely mounted in the housing 66 adjacent a stop 73 which limits its movement in the direction of the inlet port 67. A shaft 74 carries a pick-off arm 75 and is rigidly affixed to the diaphragm 72. A compression spring 76 encompasses the shaft 74 and bears against a plate 77 to bias the diaphragm 72 against the stop 73. The plate 77 includes an aperture 78 in which the shaft 74 is slidably mounted. The plate 77 is slidably mounted in slots 79 in the housing 30 and functions to control the tension of the spring 76 by being adjusted within the slots 79 by means of the nuts 80 and threaded shafts 81. The shafts 81 are rigidly affixed to bosses 82 which, in turn, are an integral part of the housing 30.

An electrical switch 83 is mounted in the housing 30 superjacent the pick-off arm 75 and includes a contact 84 which is contacted by a protuberance 85 mounted on the upper surface of the pick-off arm 75.

Referring now to FIGURE 4, the system just described is electrically controlled through the control box 48. The solenoid 46, which operates the valve 14, is connected to the control box 48 by means of electrical conductors 90 and 91. The solenoid 62, which controls the operation of valve 24, is connected to the control box 48 through conductors 93 and 94. The electrical switch 83, which is controlled by the pressure transducer 30, is connected to the control box 48 through conductors 96 and 97. The motor 34 is connected to the control box 48 through conductors 99 and 100. The clutch 39, which is electrically controlled, as will be hereinafter described, is connected to the control box 48 through a first conductor 101, a switch 102, a second conductor 103 and a third conductor 104. Operation of the electrical system is controlled by a master switch 105 which is connected to the control box 48 through conductors 106 and 107.

Referring now to FIGURE 5, the clutch 39 includes a solenoid 120 which receives electrical current through slip ring and wiper assemblies 122 and 123 respectively. The clutch drives an indicator needle 124 forming a part of the gauge 38. The needle 124 is biased toward its zero position by means of a coil spring 126. A battery 128 may be used to supply power to the clutch solenoid 120. The switch 102 may be closed completing a circuit through the battery 128 to the clutch 39. This energizes the solenoid 120 which draws the clutch 39 from mechanical engagement with the needle 124 thereby permitting the coil spring 126 to return the needle 124 to its zero position.

A first solenoid 130 is connected to switches 131, 132, and 133 which control the flow of current to the motor 34 and valves 14 and 24, respectively. A second solenoid 134 is powered by a battery 135 and controls the operation of the master switch 105.

Operation of the device will be readily understood. When it is desired to determine the remaining liquid volume in the tank 20, the master switch 105 is closed. This completes a circuit from the battery 128 to the solenoid 130 through conductor 106, switch 105 and conductor 107. The solenoid 130 closes switches 131 and 133 and opens switches 132 thereby energizing motor 34, seating valve 60 and unseating valve 44. The motor 34 drives the needle 124 up-scale on gauge 38 while gas is being metered through orifice 51 into chamber 22 creating a pressure on the inlet side of diaphragm 72. A predetermined pressure differential is established across the diaphragm 72 moving it to the right, as viewed in FIGURE 1, far enough to permit the pick-off 75 to operate switch 83. This energizes solenoid 134 from power supplied by battery 135 through a circuit comprising conductor 97, switch 83, contact 84 and conductor 96. Solenoid 134 opens switch 105 deenergizing solenoid 130 thereby opening switches 131 and 133 and closing switches 132. This stops motor 34 leaving the needle 124 in its then position on the scale of gauge 38. Simultaneously valve 24 opens venting chamber 22 and valve 14 closes stopping flow of gas from container 10 into chamber 22.

The gauge 38 will then indicate the remaining liquid volume in the tank 20. The needle 124 is returned to its zero position by closing the switch 102. This completes a circuit from the battery 128 to the solenoid 120 through conductor 103, switch 102, conductors 101 and 104, wipers 123 and collector rings 122. The solenoid 120 opens the clutch 39 permitting the coil spring 126 to return the needle 124 to its zero position.

While the particular fuel gauge herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claim.

I claim:

Apparatus for determining volume of liquid in a tank comprising a pressurized container of gas, a first conduit connecting said container to the inlet chamber of a normally closed valve, a second conduit connecting the outlet chamber of said normally closed valve to said tank above said liquid, a normally open valve connected to said tank for venting said tank to atmosphere, differential pressure means connected to said tank above said liquid, said differential pressure means including a housing having an inlet port and an outlet port, a diaphragm transversely mounted in said housing intermediate said ports, a third conduit connecting said inlet port to said tank above said liquid, said outlet port being continually open to atmosphere, means for opening said normally closed valve and closing said normally open valve to introduce gas to said tank and increase the pressure above the liquid, switch activating means affixed to said diaphragm, a switch mounted in said housing for actuation by said switch activating means upon the development of a predetermined pressure differential across said diaphragm, an electric motor connected in an electrical circuit in such a manner that it is energized upon the opening of said normally closed valve and deenergized by actuation of said switch, an indicator drivingly connected to said motor, said indicator including a scale which indicates the volume of liquid remaining in said tank as a function of the length of time said motor is energized.

References Cited by the Examiner
UNITED STATES PATENTS

| | | | |
|---|---|---|---|
| 1,945,203 | 1/1934 | Schiske | 73—290 |
| 2,064,467 | 12/1936 | Evens | 33—141 |
| 2,203,980 | 6/1940 | Burt | 137—7 |
| 2,378,849 | 6/1945 | Helleburg et al. | 73—290 |
| 2,381,821 | 8/1945 | Helleburg et al. | 73—290 |
| 2,460,655 | 2/1949 | Rickmeyer | 73—38 |
| 2,678,877 | 5/1954 | Ransome | 137—7 |
| 2,691,304 | 10/1954 | Smith et al. | 73—290 |
| 2,729,969 | 1/1956 | Innes | 73—38 |
| 2,856,944 | 10/1958 | Morrison | 137—7 |

LOUIS R. PRINCE, *Primary Examiner.*

ISAAC LISANN, *Examiner.*